United States Patent Office 3,480,680
Patented Nov. 25, 1969

3,480,680
PREPARATION OF BIS(1-HALOALKYL)SULFIDES
Wolfgang T. Eisfeld, Troisdorf, Germany, and Walter Stamm, Tarrytown, N.Y., assignors to Stauffer Chemical Company, New York, N.Y., a corporation of Delaware
No Drawing. Filed Nov. 14, 1966, Ser. No. 593,641
Int. Cl. C07c *149/18, 147/14*
U.S. Cl. 260—609
6 Claims

ABSTRACT OF THE DISCLOSURE

A method for preparing bis(1-haloalkyl)sulfides and 1-haloalkyl thiols by the reaction of a vinyl halide compound and hydrogen sulfide at superatmospheric pressure in the presence of a Friedel-Crafts catalyst at from $-30°$ C. to $120°$ C.—said compounds are useful as chemical intermediates, and insecticides.

---

This invention relates to the preparation of bis(1-haloalkyl)sulfides through the reaction of a vinyl halide compound and hydrogen sulfide. These compounds find particular utility as insecticides and miticides. They also find utility as intermediates in the preparation of a wide variety of pesticidally active compounds, inter alia, by substituting chlorine by thiocyanate moieties. They are also useful compounds in the preparation of other biologically active compounds as is disclosed hereinafter.

These compounds are presently prepared by relatively difficult and expensive means, such as through the addition of anhydrous hydrohalic acids to divinyl sulfide. Divinyl sulfide is a relatively costly chemical available in limited quantities, which is prepared only with difficulty. The present method, on the other hand, employs relatively inexpensive, large-volume chemical commodities such as vinyl chloride and hydrogen sulfide in certain embodiments and much less expensive corresponding chemical reactants in the preparation of other, more complex compounds.

In accordance with this invention, bis(1-haloalkyl)sulfides are conveniently and effectively prepared through the reaction of a vinyl halide compound with hydrogen sulfide in the presence of a Friedel-Crafts catalyst. In another embodiment of this invention, the highly reactive and useful 1-haloalkyl thiols are prepared as intermediate compounds in this reaction system.

By the term bis(1-haloalkyl)sulfides is meant those compounds having the formula:

FORMULA I

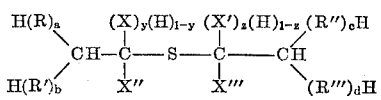

wherein $a$, $b$, $c$, $d$, $y$ and $z$ are integers having a value of from 0 to 1, inclusive; R, R', R" and R''' are divalent hydrocarbon moieties such as alkylene, arylene, cycloalkylene and the like, such that when the subscript integer $a$, $b$, $c$ and/or $d$ is 1 then the modified hydrocarbon substituent H(R), H(R'), H(R") and/or H(R''') is alkyl, cycloalkyl, alkaryl, aryl, aralkyl and substituted alkyl, alkaryl, aryl, aralkyl, cycloalkyl groups containing from 1 to about 16 carbon atoms, inclusive; and X, X', X" and X''' are halogen atoms such as fluorine, chlorine, bromine and iodine. Illustrative of the moieties represented by H(R), H(R'), H(R") and H(R''') are the alkyl groups such as methyl, ethyl, propyl, isopropyl, butyl, hexyl, nonyl, dodecyl, tridecyl and hexadecyl; the cycloalkyl groups such as cyclohexyl, methyl cyclohexyl, ethyl cyclohexyl, and the like; the aryl groups such as phenyl, biphenyl, benzyl, naphthyl, phenethyl, tolyl, ethylphenyl and the like.

As indicated above, these hydrocarbon moieties include not only the hydrocarbyl groups containing only hydrogen and carbon but also include substituted groups such as, for example, those groups illustrated above wherein one or more hydrogen atoms are substituted with inert substituents. These groups can, in fact, contain any inert substituents which do not interfere with the reaction or reactions utilized in the preparation of the subject compounds and which do not react with the reactants, reaction media or products. Such inert substituents are merely carried through the reaction and do not participate in the reaction itself, although certain of these substituents may have an effect upon the respective reaction rates. These inert substituents are easily ascertained by those skilled in the art after a consideration of the reactants, reaction conditions, and so forth. These inert substituents may be characterized as non-protonic substituents or those which do not donate a proton in normal chemical reactions. Exemplary of such substituents are the hydrocarbyl ether groups such as methoxy, ethoxy, butoxy, cyclohexyloxy, phenoxy and the like, wherein the hydrocarbon portion of the ether substituent adds no more than 8 carbon atoms to the total number of carbon atoms to the groups represented by R, R', R" and R'''. For example, substituted H(R) groups can represent phenyloxyphenyl, phenoxy phenoxyphenyl, methoxymethyl, methoxyhexadecyl, hexadecyloxymethyl and the like; and, of course, in the illustration above, thioethers can be utilized similarly.

Other inert substituents include halogens such as fluorine, bromine and iodine, nitro groups, sulfone groups, nitrile groups, ester groups, and the like. Naturally excluded are those proton-donating groups such as carboxylic acid groups, amine groups, hydroxyl groups, mercapto groups and the like. For the purposes of definition in this invention, it is to be understood the term hydrocarbon substituent is used in its broadest sense and is intended to include both unsubstituted hydrocarbon groups as well as those hydrocarbon groups having inert substituents appended thereto. It is not intended that the term hydrocarbon group be used in its narrowest definition wherein they are limtied to those groups containing only hydrogen and carbon.

In Formula I above, R, R', R" and R''' can be the same or different as can be $a$, $b$, $c$, $d$, $y$ and $z$; as well as X, X', X" and X'''.

The intermediate 1-haloalkyl thiols of this invention are those having the formula:

FORMULA II

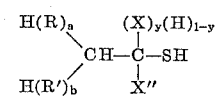

wherein R, R', X, X", $a$, $b$ and $y$ are as defined above.

The primary reaction in the process of this invention can be typified by the reaction diagram set forth below:

REACTION DIAGRAM I (A)

$$H(R)_a \underset{H(R')_b}{\overset{(X)_y(H)_{1-y}}{C}} = C - X'' + H_2S \xrightarrow{\text{catalyst}} H(R)_a \underset{H(R')_b}{\overset{(X)_y(H)_{1-y}}{CH}} - C - SH$$

(B)

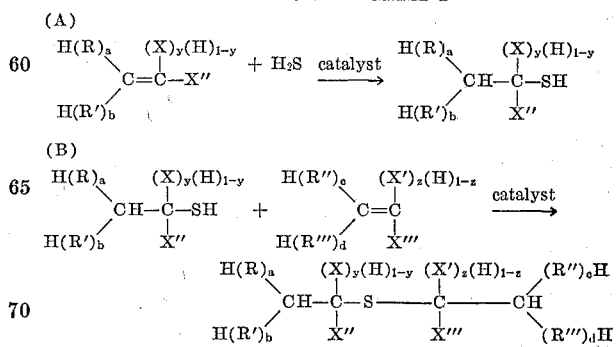

wherein R, R′, R″, R‴, a, b, c, d, y and z, X, X′, X″ and X‴ are as defined above.

In these reactions, a Friedel-Crafts type catalyst is utilized in amounts ranging from about 0.01 to about 1.5 moles per mole of vinyl halide compound and preferably from about 0.1 to about 1.1 moles per mole of vinyl halide compound. The Friedel-Crafts catalysts encompass a very large number of compounds. These are generally described as Lewis acids. While these catalysts are too well known in the art to require elaborate definition here, a comprehensive discussion and definition of these catalysts is described in the text Friedel-Crafts and Related Reactions, vol. 1, by Olah, published by Interscience, 1963. Illustrative of the typical Friedel-Crafts catalysts which serve effectively in the conduct of the present invention are the aluminum trihalides, such as aluminum bromide, aluminum fluoride, aluminum chloride, the boron trihalides, such as boron trichloride or boron trifluoride, stannic chloride, antimony chlorides, silicon tetrachloride, aluminum chloride·hydrochloric acid complex, hydrogen fluoride, boron trifluoride·hydrogen fluoride complex, aluminum bromide·hydrogen bromide complex, and the like. Preferred Friedel-Crafts catalysts for use in the present invention include aluminum chloride and boron trifluoride. This preference is dictated by the ready availability of these compounds, their inexpensiveness and the large amount of data and properties which have been accumulated in respect to them. These catalysts also include complexes such as etherates, tertiary amine complexes and the like.

The vinyl halide compounds which are useful in the conduct of the present process are typified in Reaction Diagram I, (A) and (B) above. These halides are clearly the corresponding vinyl halide compounds relative to the haloalkyl thiols and/or sulfides which are to be prepared. Illustrative of such vinyl halide compounds are vinyl chloride, vinyl fluoride, vinylidene chloride, 1-propenyl chloride, 1-octenyl fluoride, cyclohexyl vinyl bromide, ethoxypropenyl chloride, α-chlorostyrene, 1-cyclohexenyl chloride and the like. Of these vinyl compounds, it is preferred to use vinyl chloride, vinyl fluoride and vinylidene chloride as these compounds are relatively inexpensive and provide excellent yields of effective product.

The hydrogen sulfide reactant used in the present process is most desirably used in the liquid form and while it is not necessary that it be maintained in this form, it is both convenient and desired to conduct the reaction under superatmospheric pressures, up to 60 atmospheres. Conveniently, autogenous pressures of the reaction can be used, and are accordingly preferred. It will also be appreciated that when the lower molecular weight vinyl halide compounds are used such as vinyl chloride, these are generally low-boiling liquids also and with the hydrogen sulfide serve to increase the pressure within the reaction. While the use of superatmospheric pressure is not necessary, it does provide increased reaction rates and greater yields, by allowing for higher reaction temperatures.

The present process is conveniently conducted at room or ambient temperatures, although higher and lower temperatures can be effectively used if desired; for example, temperatures of from about −30° C. to about 120° C. can be used to advantage, although temperatures of from −10° C. to 50° C. are preferred. However, it will be appreciated that the preferred utilization of liquid hydrogen sulfide in this process militates against the use of relatively high temperatures. Liquid hydrogen sulfide increases the effective concentration of $H_2S$ and hence the selectivity of the thiol product over sulfide. The reactants, vinyl halide compound and hydrogen sulfide, are effectively reacted in stoichiometric ratios, dependent, of course, upon whether the product desired is the intermediate thiol or the bis-haloalkyl sulfide. In preparing the thiol, the stoichiometric ratio is 1:1; when preparing the sulfide compound, the ratio is approximately 2:1. However, ratios other than stoichiometric can be employed if desired as, for instance, would be employed in a continuous operation. In the preparation of the haloalkyl thiol, the hydrogen sulfide can be effectively used in a stoichiometric excess, whereas in the preparation of the bis-haloalkyl sulfide, the vinyl chloride compound can be utilized in a stoichiometric excess. Unless optimum conditions are employed to insure the production of the haloalkyl thiol, some production of the bis-haloalkyl sulfide invariably results, although in small amounts.

When it is desired to prepare a sulfide compound in accordance with this invention wherein the haloalkyl groups are identical, i.e., the vinyl compounds are the same, this can be done directly in a single step utilizing the conditions indicated above as can the preparation of the haloalkyl thiol with slight modification of the reaction conditions as is indicated below. The preparation of the mixed haloalkyl sulfides, however, can be either conducted in a single step through the expedient of mixing two different vinyl halide compounds or a haloalkyl thiol can be prepared, recovered and reacted separately with a vinyl halide to provide the mixed haloalkyl sulfides.

While it is not necessary, the reactions described in this invention can be conducted in the presence of an inert solvent or diluent. Solvents which can be usefully employed in this reaction are of great variety and include halogenated hydrocarbons such as carbon tetrachloride, methylene chloride, chlorobenzene as well as nitromethane, carbon disulfide, toluene, cyclohexane, pentane and the like.

The examples which follow serve to illustrate this invention. In these examples and throughout the specification, all parts and percentages given are by weight.

EXAMPLE 1

Preparation of bis(1-chloroethyl)sulfide

Thirty grams of hydrogen sulfide (.88 mole) and 40 grams of vinyl chloride (.64 mole) were added to 5.8 grams of aluminum chloride (0.044 mole) in a 300 milliliter pressure reactor. The mixture was maintained at a temperature of from 10° to 20° C. over a period of approximately fifty-four hours. After venting the excess hydrogen sulfide and vinyl chloride, 30 grams of a dark, oily product were recovered containing the aluminum chloride catalyst in solution. The structure of the reaction product was identified by spectrometric means, i.e., infrared and NMR spectra.

On attempted distillation at a temperature of approximately 160° and a pressure of 10 millimeters mercury, the product blackened and hardened. Upon treatment with aqueous sodium hydroxide at room temperature, double bonds were formed as confirmed by infrared and NMR spectra. On refluxing the product with aqueous sodium hydroxide followed by steam distillation, trithioacetaldehyde having a melting point of 125° C. could be isolated and identified by NMR spectra and comparison with a known sample. This result is in agreement with the literature (J.C.S., 1923, 1178) and proof of structure for

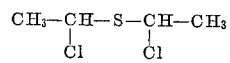

and

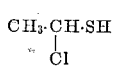

EXAMPLE 2

A mixture of 100 grams (1.60 moles) of vinyl chloride, 60 grams (1.76 moles) hydrogen sulfide and 6 grams (0.045 mole) aluminum chloride was heated to a temperature of 40° C. in a 300 milliliter pressure reactor and agitated by rocking for fifteen hours. After venting out unreacted hydrogen sulfide and vinyl chloride, 30 grams of a brown liquid resulted. Analysis of this liquid as described in Example 1 indicated the product to be identical with that of Example 1.

EXAMPLE 3

Example 2 is repeated except that 250 grams of vinyl chloride instead of 100 grams are charged to the pressure reactor. The yield of crude bis(1-chloroethyl)sulfide expected is almost quantitative.

EXAMPLE 4

A mixture of 100 grams (1.60 moles) of vinyl chloride, 60 grams (1.76 moles) hydrogen sulfide and 25 grams (0.188 mole) aluminum chloride was heated in a 300 milliliter bomb and agitated by rocking for fifteen hours at a temperature of 30° C. One hundred and thirty grams of a brown liquid product was obtained after venting out the excess unreacted starting materials. Based on spectrographic analysis, the reaction product obtained was identical with the products of Examples 1 and 2 and was analyzed as bis(1-chloroethyl)sulfide. The yield obtained in this reaction constitutes a crude yield of essentially 100% of theory.

EXAMPLE 5

A 300 milliliter stainless steel reactor was charged was 30 grams of vinyl chloride, 25 grams of hydrogen sulfide and about 3 grams of boron trifluoride. The mixture was maintained at a temperature of approximately 50° C. for a period of fifteen hours, during which time it was agitated by rocking. After venting, 4 grams of a brown, heavy liquid resulted which on standing separated to give a relatively colorless upper phase and a red-brown lower phase. The infrared spectrum of the upper phase was identical with those of Examples 1 through 4.

In the table which follows, Examples 6–20 are set forth wherein representative compounds of this invention are prepared utilizing the same procedures and steps set forth in Example 1 above wherein the precursor-corresponding vinyl halide compound is substituted for the vinyl chloride of Examples 1–5 to yield the product as indicated:

TABLE I

| Example: | Vinyl halide compound | Product bis(1-haloalkyl) sulfide |
|---|---|---|
| 6 | $CH_2=CH-F$ | $CH_3-CH(F)-S-CH(F)-CH_3$ |
| 7 | $CH_2=C(Cl)(Cl)$ | $CH_3-C(Cl)_2-S-C(Cl)_2-CH_3$ |
| 8 | $CH_3-(CH_2)_{15}-CH=CH-Cl$ | $(CH_3-(CH_2)_{15}-CH_2-CH(Cl)-)_2S$ |
| 9 | $C_6H_5-CH=CH-Cl$ | $(C_6H_5-CH_2-CH(Cl)-)_2S$ |
| 10 | $(CH_3)_3C-CH=CH-Br$ | $((CH_3)_3C-CH_2-CH(Br)-)_2S$ |
| 11 | $Cl-CH=CH-Cl$ | $(Cl-CH_2-CH(Cl)-)_2S$ |
| 12 | $CH_3-O-CH_2-CH=CH-I$ | $(CH_3-O-CH_2-CH_2-CH(I)-)_2S$ |
| 13 | $2,4,6-(NO_2)_3C_6H_2-O-CH_2-CH=CH-Cl$ | $(2,4,6-(NO_2)_3C_6H_2-O-CH_2-CH_2-CH(Cl)-)_2S$ |
| 14 | $(CH_3)_2C=CH-Cl$ | $((CH_3)_2CH-CH(Cl)-)_2S$ |
| 15 | $(Cl-CH_2-CH_2)_2C=C(F)$ | $((Cl-CH_2-CH_2)_2CH-CH(F)-)_2S$ |
| 16 | $(C_6H_5)_2C=C(H)-Cl$ | $((C_6H_5)_2CH-CH(Cl)-)_2S$ |
| 17 | $CH_2=CH-Cl$ and $C_4H_4S-CH=CH-F$ | $CH_3-CH(Cl)-S-CH(F)-CH_2-C_4H_4S$ |

TABLE I—Continued

| Vinyl halide compound | Product bis(1-haloalkyl) sulfide |
|---|---|
| Example: | |
| 18........ $NO_2-\langle\bigcirc\rangle-CH=CH-Cl$ and $NO_2CH_2-CH_2-CH=CH-Cl$ | $NO_2-\langle\bigcirc\rangle-CH_2-\underset{Cl}{CH}-S-\underset{Cl}{CH}-(CH_2-)_3-NO_2$ |
| 19........ $\underset{CH_3}{\overset{CH_3}{>}}C=C\underset{F}{\overset{F}{<}}$ and $\langle\bigcirc\rangle-CH=CH-F$ | $\langle\bigcirc\rangle-CH_2-\underset{F}{CH}-S-\underset{F}{\overset{F}{\underset{|}{C}}}-CH\underset{CH_3}{\overset{CH_3}{<}}$ |

EXAMPLE 20

Preparation of 1-chloroethyl thiol

To a 300 milliliter pressure reaction vessel containing 13.2 grams (0.1 mole) of aluminum chloride are charged 6.2 grams (0.1 mole) of vinyl chloride and 13.6 grams (0.4 mole) of hydrogen sulfide. The reaction vessel and the reaction mixture are maintained at a temperature of 10° C. for a period of approximately thirteen hours, during which time the reaction vessel is rocked to provide agitation to the reaction mixture. At the end of this time, the reaction vessel is vented to release non-reacted gaseous components and the product 1-chloroethyl thiol is recovered directly from the reaction vessel.

By following the procedure set forth in Example 5, various other 1-haloalkyl thiols are readily prepared by substituting therefor the corresponding vinyl halide compound for the vinyl chloride exemplified in Example 20. In Table II below, Examples 21–28 are set forth. In these examples various vinyl halide compounds are set forth which are substituted for the vinyl chloride of Example 20. The thiol product which is formed therefrom is also set forth in Table II.

TABLE II

| Vinyl halide compound | 1-haloalkyl-thiol product |
|---|---|
| Example: | |
| 21........ $CH_2=C\underset{Cl}{\overset{Cl}{<}}$ | $CH_3-\underset{Cl}{\overset{Cl}{\underset{|}{C}}}-SH$ |
| 22........ $CH_3-O-CH=CH-Cl$ | $CH_3-O-CH_2-\underset{Cl}{CH}-SH$ |
| 23........ $CH_3-\underset{CH_3}{\overset{CH_3}{\underset{|}{C}}}-CH=CH-F$ | $CH_3-\underset{CH_3}{\overset{CH_3}{\underset{|}{C}}}-CH_2-\underset{F}{CH}-SH$ |
| 24........ $\langle\bigcirc\rangle\overset{\langle\bigcirc\rangle}{>}C=CH-I$ | $\langle\bigcirc\rangle\overset{\langle\bigcirc\rangle}{>}CH-\underset{I}{CH}-SH$ |
| 25........ $NO_2-\langle\bigcirc\rangle-C=CH-Br$ | $NO_2-\langle\bigcirc\rangle-CH-\underset{Br}{CH}-SH$ |
| 26........ $Cl-\langle S\rangle-CH=CH-Cl$ | $Cl-\langle\bigcirc\rangle-CH_2-\underset{Cl}{CH}-SH$ |
| 27........ $NO_2-CH_2-CH_2-CH=CH-I$ | $NO_2-CH_2-CH_2-CH_2-\underset{I}{CH}-SH$ |
| 28........ $\langle\bigcirc\rangle-CH=C\underset{F}{\overset{F}{<}}$ | $\langle\bigcirc\rangle-CH_2-\underset{F}{\overset{F}{\underset{|}{C}}}-SH$ |

As has been indicated in the specification above, these thiol products can be utilized to further react with themselves, alone or in admixture, to provide combined bis-sulfides.

The bis(1-haloalkyl)sulfides of this invention are biologically active and at least in respect to the chloroethyl analogs are related to the sulfur mustards. These compounds exhibit insecticidal and miticidal activity. Additionally, these compounds are exceptionally reactive and can be utilized as intermediates in reactions with many organic and inorganic compounds. For example, mild oxidizing agents will oxidize these sulfides to sulfoxides; strong oxidizing agents will give bis(1-haloalkyl)sulfones. Reaction with a variety of organic halides such as benzyl-chloride forms corresponding sulfonium salts; the chlorine in bis(1-haloalkyl)sulfides is also very reactive and for example can be easily substituted by thiocyanate groups (—SCN), or isocyanate groups (—NCO) by reaction with the respective alkali metal salts in suitable solvents, such as acetonitrile; similarly dithiocarbamates can be prepared with sodium dithiocarbamate; xanthates are formed by exchange reactions with the metallic xanthates; facile reaction also occurs with sodium trithiocarbonate, sodium alkoxides, mercuric cyanide, or Grignard reagents; ring closures can be effected with hydrazine or substituted hydrazines, hydroxyl amines, primary amines and the like. Similarly, metallic agents such as zinc powder can lead to cyclization.

Utilizing bis(1-chloroethyl)sulfide as exemplary of the compounds of Formula I, Table III below sets forth the other respective reactants and corresponding products formed.

TABLE III.—REACTIONS WITH BIS(1-CHLOROETHYL) SULFIDE

| Reactant | Product |
|---|---|
| Mild [O] Dilute H$_2$O$_2$ (3%) at 0° C. | CH$_3$—CH—S(=O)—CH—CH$_3$ with Cl, Cl |
| Strong [O] H$_2$O$_2$ (30%) at 50° C. | CH$_3$—CH—S(=O)$_2$—CH—CH$_3$ with Cl, Cl |
| NH$_2$—NH$_2$ | CH$_3$—CH—S—CH—CH$_3$ with NH—NH ring |
| NH$_2$—CH$_2$—NH$_2$ | CH$_3$—CH—S—CH—CH$_3$ with NH—CH$_2$—NH ring |
| 2NaSCN | CH$_3$—CH—S—CH—CH$_3$ with SCN, SCN |
| 2NaNCO | CH$_3$—CH—S—CH—CH$_3$ with NCO, NCO |
| 2Na—S—C(=S)—NH$_2$ | CH$_3$—CH—S—CH—CH$_3$ with S—C(=S)—NH$_2$, S—C(=S)—NH$_2$ |
| Na—S—C(=S)—S—Na | CH$_3$—CH—S—CH—CH$_3$ with S—C(=S)—S ring |
| 2NaOCH$_3$ | CH$_3$—CH—S—CH—CH$_3$ with OCH$_3$, OCH$_3$ |
| 2Hg(CN)$_2$ | CH$_3$—CH—S—CH—CH$_3$ with CN, CN |
| 2CH$_3$—CH$_2$—Mg—Br | CH$_3$—CH—S—CH—CH$_3$ with CH$_2$CH$_3$, CH$_2$CH$_3$ |
| 2HO—NH$_2$ | CH$_3$—CH—S—CH—CH$_3$ with NH—O—NH ring |

We claim:
1. The method of preparing bis(1-haloalkyl)sulfides by reacting at least one vinyl halide compound selected from the group consisting of vinyl chloride, vinylidene chloride, vinyl fluoride, α-chlorostyrene and alkoxy alkyl vinyl halide wherein the alkoxy and alkyl groups contain from 1 to about 16 carbon atoms, with hydrogen sulfide in a mole ratio of vinyl halide to hydrogen sulfide greater than 1:1 in the presence of a Friedel-Crafts catalyst.

2. The process of claim 1 wherein the reaction is conducted at a temperature from about −30° C. to about 120° C. at a pressure greater than atmospheric.

3. The method of claim 1 wherein the Friedel-Crafts catalyst is AlCl$_3$.

4. The method of preparing 1-haloalkyl thiols by reacting a vinyl halide selected from the group consisting of vinyl chloride, vinylidene chloride, vinyl fluoride, α-chlorostyrene and alkoxy alkyl vinyl halide wherein the alkyl and alkoxy groups contain from about 1 to 16 carbon atoms with hydrogen sulfide in a mole ratio of hydrogen sulfide to vinyl halide of at least 1:1 in the presence of a Friedel-Crafts catalyst.

5. The process of claim 4 wherein the reaction is conducted at a temperature from about −30° C. to about 120° C. at a pressure greater than atmospheric.

6. The method of claim 4 wherein the Friedel-Crafts catalyst is AlCl$_3$.

References Cited

UNITED STATES PATENTS 2,398,480  4/1946  Vaughan et al. _____ 204—158
2,498,872  2/1950  Bell et al. _____ 260—609

OTHER REFERENCES

Reid: "Chemistry of Bivalent Sulfur," vol. I (1958), pp. 18–21.
Reid: "Chemistry of Bivalent Sulfur," vol. II (1958), pp. 29–37.

CHARLES B. PARKER, Primary Examiner

D. R. PHILLIPS, Assistant Examiner

U.S. Cl. X.R.

260—243, 306.7, 327, 453, 454, 455, 465.1, 607, 999